May 14, 1968  W. GREEN  3,382,601
FISHING DEVICE
Filed Jan. 9, 1967
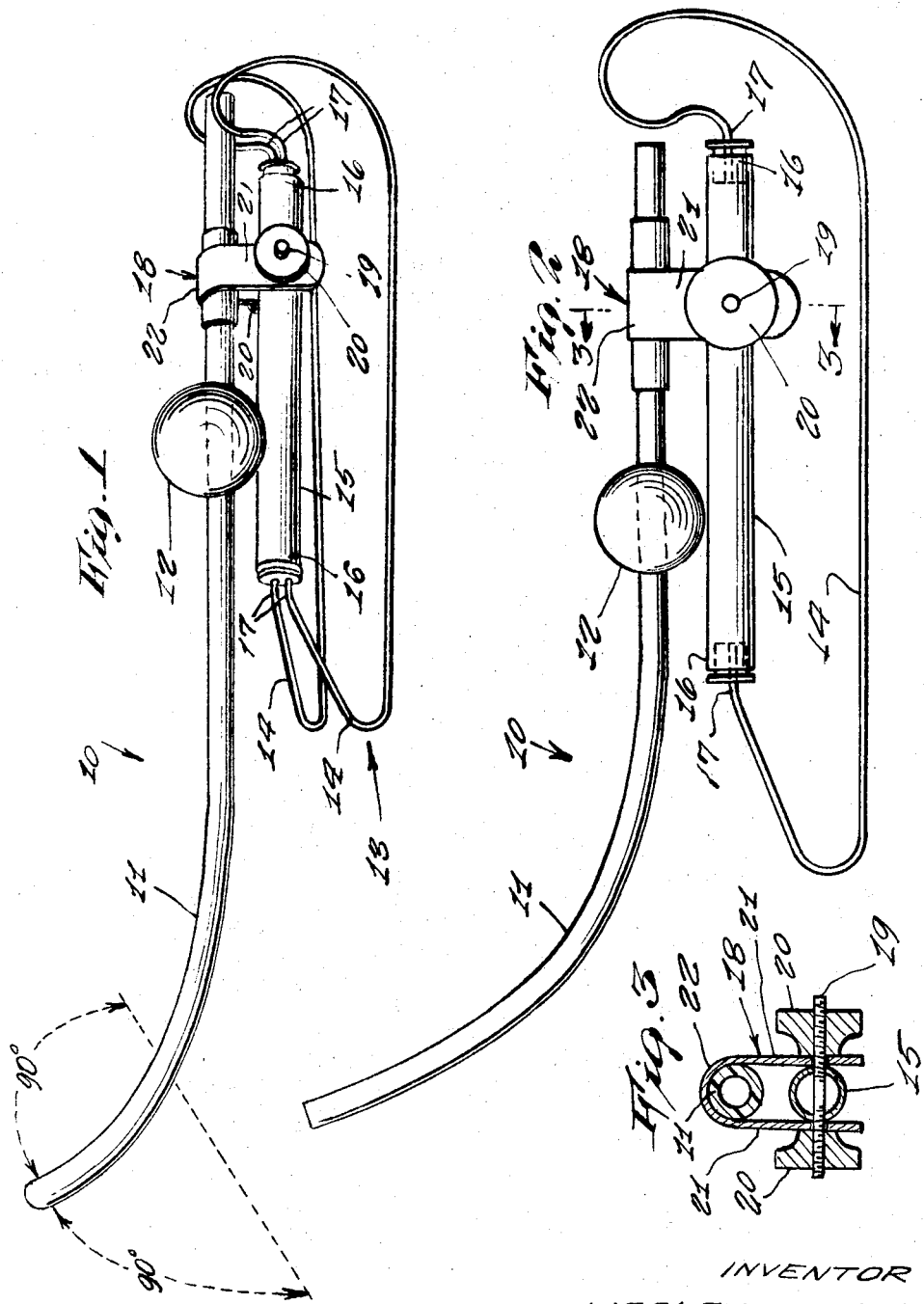
INVENTOR
WESLEY GREEN

United States Patent Office 3,382,601
Patented May 14, 1968

3,382,601
FISHING DEVICE
Wesley Green, 390 Pocahontas St.,
Xenia, Ohio 43585
Filed Jan. 9, 1967, Ser. No. 608,185
4 Claims. (Cl. 43—43.14)

ABSTRACT OF THE DISCLOSURE

A fishing device that rests on the bottom of a body of water and having an angularly adjustable tube through which the fishing line freely runs. The tube may be adjusted to hold bait on the line an adjustable distance from the bottom.

This invention relates generally to fishing apparatus. More specifically it relates to fishing devices for use by sports fisherman.

A principal object of the present invention is to provide a fishing device that rests upon the bottom of a body of water during operative use.

Yet another object is to provide a fishing device that holds the bait up off the bottom.

Yet another object is to provide a fishing device wherein the bait height is adjustable, and wherein the fish is allowed a free line.

Yet another object is to provide a fishing device which may be used with any ordinary spinning, casting rod or hand line.

Yet another object is to provide a fishing device that can be very effectively used in drift fishing using natural or artificial baits.

Other objects are to provide a fishing device which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention,

FIGURE 2 is a side elevation view thereof, and

FIGURE 3 is a cross sectional view taken on line 3—3 of FIGURE 2.

Referring now to the drawing in detail, the reference numeral 10 represents a fishing device according to the present invention wherein there is a plastic tube 11 which is buoyant and resilient. A cork, wood or plastic float 12 is fitted over one end of the tube 11 to provide additional buoyancy. This buoyancy serves to set the device right side up on the water bottom in a readily operative position. Additionally the buoyancy serves to raise the bait above the bottom. By adjusting the float along the tube, a greater or lesser buoyancy is accomplished for accommodating a heavy or light bait at a desired elevation.

A base 13 for supporting the tube, is comprised of a pair of runners 14 which carry a rail 15 thereupon, the rail comprising a sleeve into the ends 16 of which the ends 17 of the runners are secured. A U-shaped bracket 18 is secured pivotally free on a threaded rod 19 that is fitted transversely through the rail, and a thumb nut 20 is engaged to each end of the rod 19 to secure the bracket in fixed adjusted position relative to the rail. The bracket 18 includes parallel legs 21 through which the rod extends, and a semi-circular portion 22 therebetween against which the plastic tube 11 is secured. Thus angular adjustment of the tube relative to the base is made possible.

In operative use, the fisherman threads a bare fish line coming from a pole and reel through the plastic tube 11 from the rear toward the front thereof. He then slips a bead on the line, ties on a fish hook, baits the hook, and then casts out. The device 10 may land in any position on the water, but due to the way it is balanced, it will immediately turn right side up, even in only a foot depth of water and settle on the bottom in a right side up position with the bait boomed to a pre-set height off the bottom and ready to fish. The slack line is then taken up on the reel, making a relatively taut line between the pole and the device. As the fish bites and runs with the bait, the device will stand still, while the fishing line pays freely through the resilient, plastic tube. The fish has nothing to drag but the bait and line, as no sinker is needed on the line, this being more to the fish's liking.

It is to be noted that the resiliency of the plastic tube and the float on the plastic tube tend to act as a teaser to a fish; as he nibbles, it pulls away from taking up the slack thus making him to bite more vigorously.

It is to be further noted that the device holds a bait above a mud, gravel or rough bottom, making it easier for a fish to find it.

While various changes may be made in the detail construction, it is understood that such changes will be within the spirit and scope of the present invention as is defined by the appended claims.

Having thus set forth and disclosed the nature of this invention, what is claimed is:

1. In a fishing device, the combination of a base, said base supporting a resilient plastic tube thereupon, means for angular adjustment of said tube relative to said base whereby one end of said tube is at a pre-set height above a bottom of a body of water, and adjustable floatation means carried by said tube.

2. The combination as set forth in claim 1 wherein said base comprises a pair of spaced apart runners and a rail carried on said runners, said rail comprising a sleeve into the ends of which the ends of said runners are secured.

3. The combination as set forth in claim 2 wherein said means for angular adjustment comprises a U-shaped bracket having parallel legs and a semi-circular portion therebetween, a threaded rod extending through said legs and transversely through said rail, a thumb nut engaged on each end of said threaded rod to bear said legs against said rail to secure said bracket in fixed position relative to said rail, and said tube being secured to said semi-circular portion of said bracket.

4. The combination as set forth in claim 3, wherein said adjustable floatation means comprises a float made of floatable material which is slidable along the length of said tube and frictionally secured thereto in a selected position.

References Cited

UNITED STATES PATENTS

| 2,014,517 | 9/1935 | Bergow | 43—44.9 X |
| 2,577,143 | 12/1951 | Midland | 43—43.15 X |
| 2,623,320 | 12/1952 | Bowman | 43—44.97 X |
| 2,710,480 | 6/1955 | Gehrig | 43—43.15 |
| 2,792,663 | 5/1957 | Sinclair | 43—43.15 |
| 3,192,661 | 7/1965 | Tyrrell | 43—44.9 X |

SAMUEL KOREN, Primary Examiner.

J. H. CZERWONKY, Assistant Examiner.